United States Patent
Beretta

[11] Patent Number: 5,667,869
[45] Date of Patent: Sep. 16, 1997

[54] PREDRAWN NET PARTICULARLY FOR GEOTECHNICAL USE

[75] Inventor: Mario Beretta, Sirtori, Italy

[73] Assignee: Tenax S.p.A., Viganò, Italy

[21] Appl. No.: 419,488

[22] Filed: Apr. 10, 1995

[30] Foreign Application Priority Data

Apr. 12, 1994 [IT] Italy ................ MI94A0682

[51] Int. Cl.$^6$ .............. B32B 3/24; B29C 55/00
[52] U.S. Cl. ............ 428/131; 428/134; 428/135; 428/166; 428/178; 428/72; 428/215; 428/910; 428/198; 428/105; 428/107; 428/113; 428/114; 428/292.1; 428/298.1; 264/145; 264/146; 264/167; 264/288.4; 264/291; 264/DIG. 81; 442/1
[58] Field of Search ................ 428/131, 255, 428/134, 135, 166, 178, 72, 215, 910, 292, 294, 198, 105, 107, 113, 114; 264/145, 146, 167, 288.4, 291, DIG. 81; 442/1, 292.1, 298.1

[56] References Cited

U.S. PATENT DOCUMENTS

| 3,952,127 | 4/1976 | Orr | 428/255 |
|---|---|---|---|
| 4,057,449 | 11/1977 | Livingston et al. | 156/167 |
| 4,059,713 | 11/1977 | Mercer | 428/36 |
| 4,123,491 | 10/1978 | Larsen | 264/167 |
| 4,242,295 | 12/1980 | Urquhart | 264/146 |
| 4,265,956 | 5/1981 | Colijn | 428/134 |
| 4,303,714 | 12/1981 | Mercer | 428/135 |
| 4,374,798 | 2/1983 | Mercer | 264/288.8 |
| 4,469,738 | 9/1984 | Himelreich, Jr. | 428/198 |
| 4,636,419 | 1/1987 | Madsen et al. | 428/131 |
| 5,053,264 | 10/1991 | Beretta | 428/131 |
| 5,399,411 | 3/1995 | Suzuki et al. | 428/105 |

FOREIGN PATENT DOCUMENTS

| 2035191 | 6/1980 | United Kingdom . |
|---|---|---|
| 2073090 | 10/1981 | United Kingdom . |

Primary Examiner—William Watkins
Attorney, Agent, or Firm—Guido Modiano; Albert Josif; Daniel O'Byrne

[57] ABSTRACT

A predrawn net particularly for geotechnical use including an initial component that forms a first and a second layers that are respectively constituted by a first set of mutually substantially parallel filaments and by a second set of mutually substantially parallel filaments that lie transversely with respect to the filaments of the first set, so as to form a plurality of mutual joints. The filaments of the two sets mutually interpenetrate in the joints over a thickness that is less than 50% of one of the layers. The initial component is more than 8 mm thick. The filaments of at least one of the sets are drawn in the direction defined by the respective set of filaments so that the stretching action passes through the joints without substantially affecting the filaments of the other one of the sets.

8 Claims, 3 Drawing Sheets

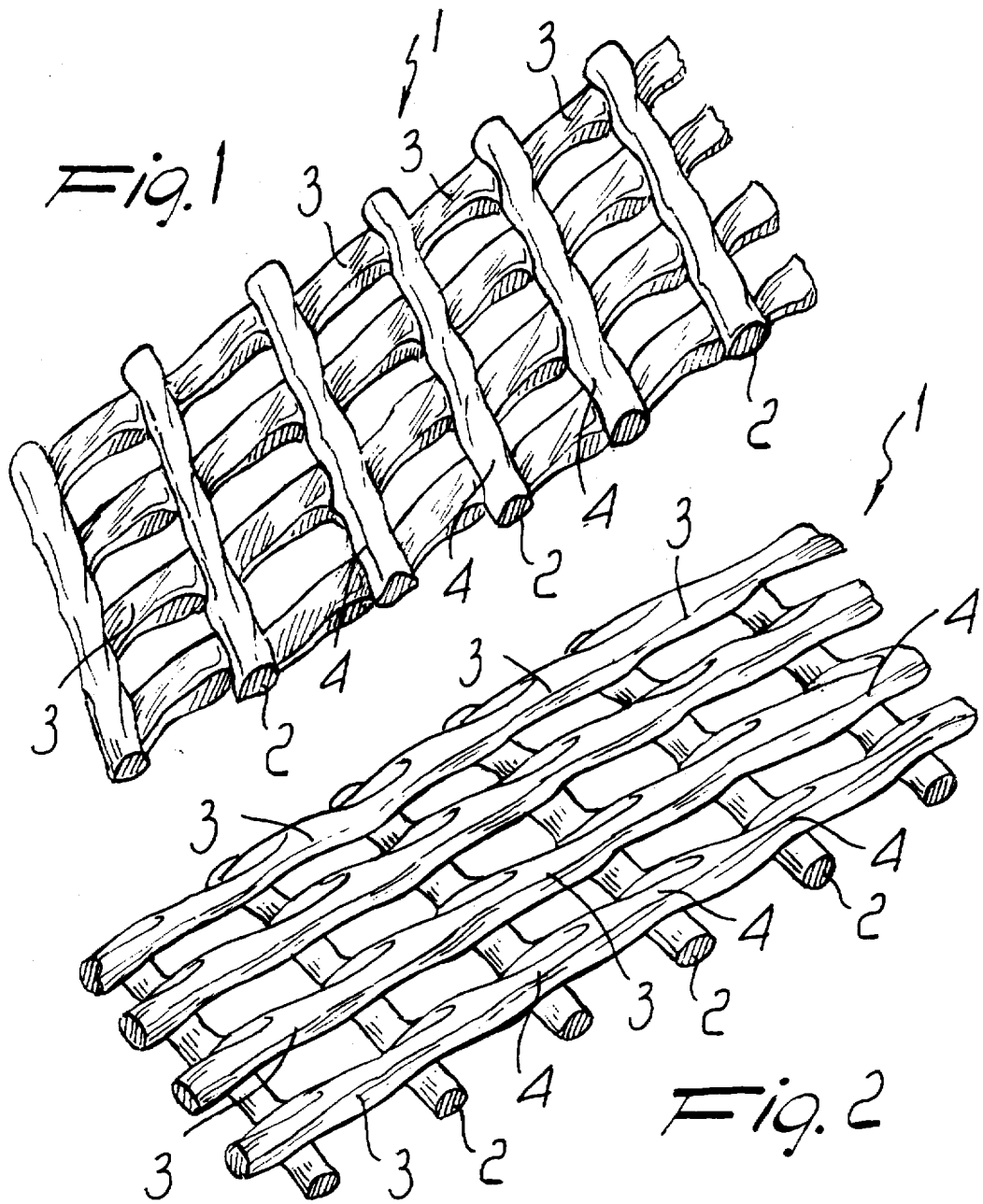
Fig. 1
Fig. 2
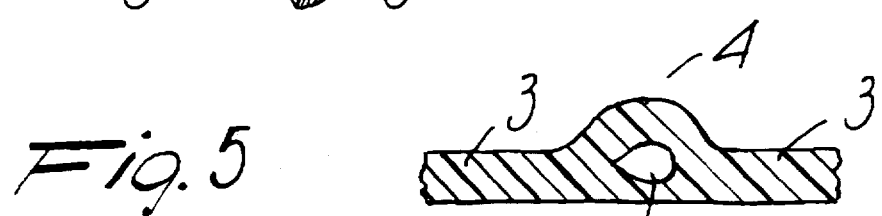
Fig. 5
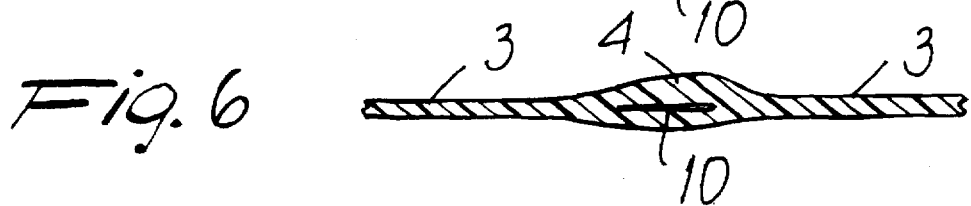
Fig. 6

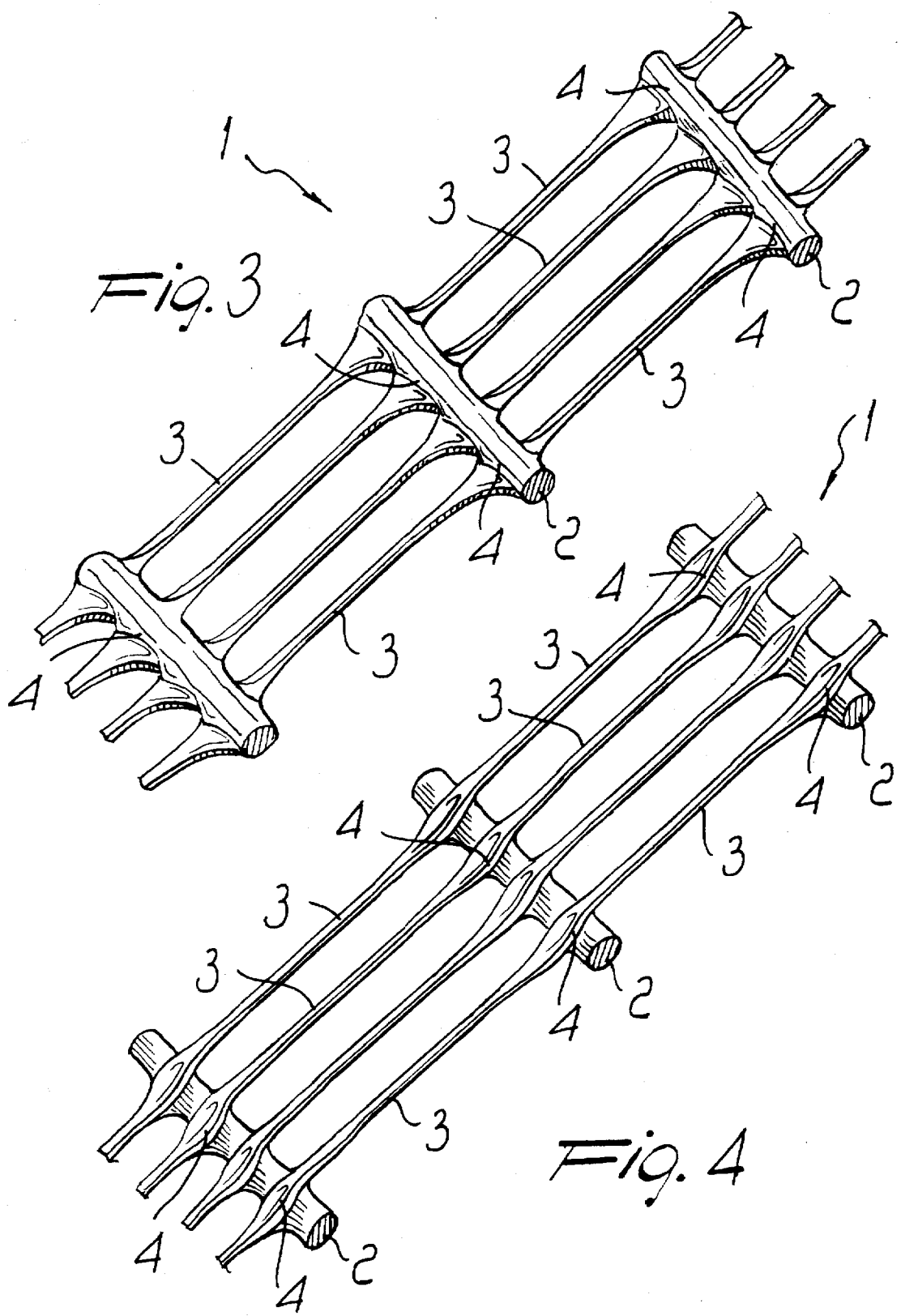

PREDRAWN NET PARTICULARLY FOR GEOTECHNICAL USE

BACKGROUND OF THE INVENTION

The present invention relates to a predrawn net particularly for geotechnical use and to the method for manufacturing it.

Nets are already currently known which are obtained from initial components that have a considerable thickness and are constituted by flat symmetrical or non-symmetrical sheets provided with holes or recesses, which are then drawn, so as to obtain a net, in one or two directions, depending on whether the net is single- or double-drawn.

Nets of this type are disclosed for example in patents GB 2,073,090 and GB 2,035,191, that entail the formation of a flat sheet, with a square or rectangular pattern of holes, which is then drawn in one or two directions.

One of the problems that these patents seek to solve relates to the strength of the joints, which must be strong enough without containing too much plastic material; in order to solve this problem, production starts with an initial sheet-like component in which subsequent treatments produce scarcely drawn joints, since if the joints were to be drawn considerably, they would be particularly fragile if subjected to flexing transversely to the single-axis drawing direction.

In the case of double-drawn joints, the molecules that are at the center of the joint are either not stretched, and therefore do not effectively contribute to the strength of the entire structure, or are stretched radially with respect to the center of the joint, and accordingly the stretched molecules are not aligned with the direction of the stress applied to aligned filaments.

In this case the net, subjected to traction, can in fact break very easily at the joint, with imperfect utilization of the strength of the filaments.

For example, when single-drawn nets obtained by drawing a perforated sheet, according to the method disclosed in U.S. Pat. No. 4,374,798, are drawn substantially along the entire joint, they suffer easy breakage of said joint due to the application of transverse flexure or to the application of a concentrated load, such as the one produced by a rock in the soil.

If a rock produces a crack on a joint in products obtained from a flat perforated sheet, said products oppose no resistance to the spread of the crack throughout the joint, since said joint is orientated symmetrically.

Other known solutions, in which the initial product was constituted by two sets of filaments mutually superimposed and arranged transversely, generally had a very limited thickness, and in case of a relatively intense stretching the filaments of one set and the filaments of the other set would mutually separate in the region of the joint.

The alternative was therefore to stretch the filaments up to the inside of the joint, but not through the joints themselves, so as to avoid causing the separation of the filaments of the joint regions.

SUMMARY OF THE INVENTION

A principal aim of the invention is indeed to solve the problems described above by providing a drawn net, particularly for geotechnical use, in which it is possible to have high strength in the joint region as well, without the risk of producing forces that cannot be withstood by the orientation of the stretched molecules, but on the contrary significantly increasing the strength characteristics.

Within the scope of this aim, a particular object of the invention is to provide a net that is predrawn in one or two directions and has a joint that is drawn in the direction of the filament without causing separation at the joint.

Another object of the invention is constituted by the fact that the drawn filaments, by having an uninterrupted orientation in the joint, produce low creep when subjected to constant loads, thus achieving one of the most important characteristics required to the high-thickness products that are used, for example, in geotechnical applications, such as soil reinforcement, in which a predrawn net is subjected to a constant load for periods up to one hundred years.

Another object of the present invention is to provide a net that is obtained from two sets of mutually transverse filaments in which, at the joints, any force that tends to open a crack in one part of the joint is effectively contrasted by the orientated material that is present in the other part of the joint, whose orientation is substantially parallel to the axial direction of the force.

This aim, these objects, and others which will become apparent hereinafter are achieved by a predrawn net particularly for geotechnical use, characterized in that it comprises an initial component having a first and a second layers that are respectively constituted by a first set of mutually substantially parallel filaments and by a second set of mutually substantially parallel filaments that lie transversely with respect to the filaments of said first set, so as to form a plurality of mutual joints, said filaments of said sets mutually interpenetrating in said joints over a thickness that is less than 50% of the thickness of any one of said layers, said initial component being more than 8 mm thick, at least the filaments of one of said sets being drawn in the direction defined by the respective set of filaments so that the stretching action passes through said joints.

BRIEF DESCRIPTION OF THE DRAWINGS

Further characteristics and advantages will become apparent from the description of a preferred but not exclusive embodiment of a predrawn net particularly for geotechnical use, illustrated only by way of non-limitative example in the accompanying drawings, wherein:

FIG. 1 is a schematic perspective view of the initial component, seen from one side;

FIG. 2 is a perspective view of the initial component, seen from the other side;

FIG. 3 is a schematic view of the net, drawn in one direction and seen from one side;

FIG. 4 is a view of the net, drawn in one direction and seen from the other side;

FIG. 5 is a sectional view, taken at the joints of the initial component;

FIG. 6 is a schematic sectional view of a joint region after drawing;

DESCRIPTION OF THE PREFERRED EMBODIMENTS

Figure 7:
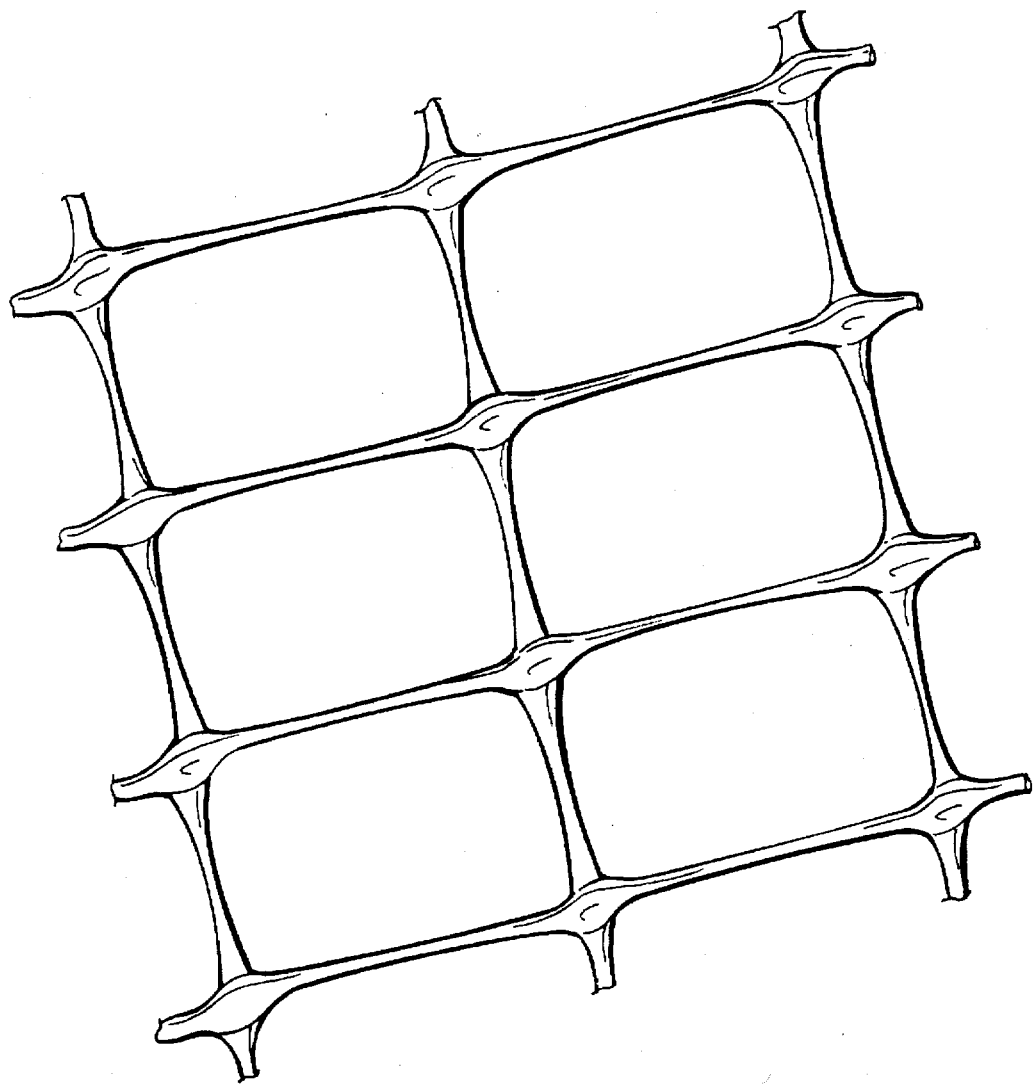
FIG. 7 is a view of a net that has been drawn along two axes.

With reference to the above figures, the predrawn net particularly for geotechnical use, according to the invention, comprises an initial component, generally designated by the reference numeral 1, which is preferably but not necessarily obtained by extruding two sets of filaments by means of circular coaxial contrarotating spinnerets and by subsequently cutting said filaments in a helical pattern along the direction of one of the two sets of filaments, so that the initial component has in practice a first and a second layers that are constituted by a first set of mutually substantially parallel filaments 2 and by a second set of mutually substantially parallel filaments 3 that lie transversely to the filaments of the first set, so as to form a plurality of joints 4 that in practice interconnect the filaments of the two sets.

In practice, the initial component is obtained from an initial material that is thick, not flat, and asymmetrical, and in which the individual filaments of one set are connected to the individual filaments of the other set by virtue of an interpenetration at the joint regions that is smaller than 50% of the thickness of any one of the two layers.

The overall thickness of the initial component is greater than 8 mm, and accordingly the individual filaments of each layer have considerable dimensions.

Experimental tests have shown that an initial material having the above described characteristics allows to obtain joints that are drawn in an optimum manner and in which the central portions of said joints are substantially drawn in the direction of the filaments, accordingly allowing to have all the advantages arising from molecular orientation without the typical drawback of the solutions of the known art, wherein the filaments of the various sets can easily separate in the joints.

In practice, when the filaments extruded by one of the spinnerets make contact with the filaments extruded by the other spinneret, they have undergone a certain cooling, which is however not as significant as in the case of small-size filaments; therefore the contact that occurs between the two sets of filaments produces sufficient adhesion between said filaments of the joint, in any case allowing to highly orientate the junction in the directions of mutually perpendicular filaments without thereby allowing said filaments to mutually separate due to the substantial orientation of the filaments in said joint.

The initial component thus produced is subjected to drawing in the direction determined by the filaments of one of said sets, at a temperature that is lower than its melting temperature, thus obtaining a single-drawn net.

As shown in FIGS. 3 and 4, the filaments that belong to one of the sets are drawn until their thickness decreases substantially in the joint, accordingly orientating the portion of plastic material of the joint that belongs to the plane of arrangement of the drawn filaments, whereas the portion of plastic material of the joint that belongs to the plane of arrangement of the other set of filaments is substantially not orientated or is orientated only as regards the part that is in contact with the drawn filaments.

This produces a product having exceptional characteristics and in which the joint is drawn in the direction of the drawn filament and the drawn filament cannot be separated from said joint.

Another considerable advantage is constituted by the fact that by virtue of the continuity of the orientation of the joint the drawn filaments produce very limited creep when they are subjected to constant loads.

If one wishes to obtain a double-drawn net, the single-drawn net is drawn transversely to the direction of the first drawing.

In this case, too, the drawing operations are performed so as to obtain a substantial orientation of the molecules in the joint throughout the joint.

As in the case of the first drawing, as regards the joint regions, the molecular alignment process affects substantially the portion of plastic material of the plane to which the filaments subjected to the stretching process belong, whereas it does not substantially affect the plastic material that had already been orientated during the preceding step.

The double-orientated finished product that is obtained has filaments that are substantially orientated along their own direction even in the joint, and in which there is no substantial discontinuity in orientation directions, since the portion of plastic material that forms the joint, which is the result of a contribution of each one of the filaments, is substantially orientated in the direction of the filaments that form it.

In this manner, the resulting product is capable of transferring the load from one filament to the next aligned one in the most efficient manner, but this is not achieved to the detriment of the adhesion of the two sets of filaments of the joints, since the filaments obtained from the initial component described above, drawn in two directions, provide a particular resistance to separation that allows to transfer intense loads through the joints, even among perpendicular filaments.

The resulting double-drawn net, according to what has been described above, furthermore overcomes the problems that had remained unsolved in known methods for obtaining double-drawn products with high thicknesses, to be used for critical applications, such as for example geotechnical ones, where one of the most important characteristics of the products is resistance to the damage caused by their use underground.

With the described embodiment, any force that tends to open a crack in one part of the joint is effectively contrasted by the orientated material that is present in the other part of the joint, which is orientated parallel to the direction along which the force acts.

In a particular configuration, it should be added to the above that a cavity 10 is formed at the joints in the region where the filaments of one set couple to the filaments of the other set; said cavity is located substantially at the center of the joint and contains air or another gas.

The cavity is fully surrounded by plastic material and in practice has no outward openings.

By stretching the initial material, the gas bubble provided in the cavity acts as a separator between the material added in the joint by the two perpendicular filaments, helping to limit the effect of the presence of one of said filaments on the orientation of the other filament and thus allowing to obtain single-drawn and double-drawn products with a high degree of molecular orientation of the material of the filaments that form the joint and is at the center of the joint, so that the direction of said orientation is more similar to the direction of the orientation of the filaments that form said joint.

The fact that the gas bubble provided in the cavity of the initial component does not have outward openings allows to obtain a finished product in which the joint contains a partial separation element that is continuously surrounded by plastic material.

From the above description it is therefore evident that the invention achieves the intended aim and objects, and in particular the fact is stressed that a drawn net is provided starting from an initial component that is obtained from two sets of filaments arranged on mutually parallel and spaced planes that at least partially interpenetrate and allow, by virtue of the high thickness that is used, to have stable joints and to perform drawing so as to fully affect the joints as well.

The invention thus conceived is susceptible of numerous modifications and variations, all of which are within the scope of the inventive concept.

All the details may furthermore be replaced with other technically equivalent elements.

In practice, the materials employed, so long as they are compatible with the specific use, as well as the contingent shapes and dimensions, may be any according to the requirements.

What is claimed is:

1. Predrawn net particularly for geotechnical use, comprising first and a second layers that are respectively constituted by a first set of mutually substantially parallel filaments and by a second set of mutually substantially parallel filaments that lie transversely with respect to the filaments of said first set, so as to form a plurality of mutual joints, said first and second layers being formed from an initial substantially undrawn component in which said filaments of said sets mutually interpenetrate in said joints over a thickness that is less than 50% of the thickness of any one of said layers of the initial substantially undrawn component, said initial substantially undrawn component being more than 8 mm thick, at least the filaments of one of said sets of the predrawn net being drawn in the direction defined by the respective set of filaments so that the stretching action passes through said joints in the direction of the stretching action, so that a substantial part of the material of the joint added to said joint by the filaments of the other one of said sets is not orientated, and wherein the net comprises, at said joints of the predrawn net, a cavity that contains a gas and is surrounded by the plastic material that forms said filaments.

2. Net according to claim 1, wherein the filaments of said other set of the predrawn net are drawn along the direction determined by the filaments of said other set, each one of said filaments being drawn, at said joints, in the direction determined by the filament.

3. Net according to claim 1, wherein, the gas bubble contained in said cavity of the joints of the predrawn net is adapted to act as a separator between the material that forms the joints of mutually transverse filaments; the joints between said filaments being internally provided with a separator element that is surrounded by plastic material.

4. Method for manufacturing a predrawn net, particularly for geotechnical use, comprising the steps of:

extruding, by means of circular coaxial contrarotating spinnerets, an initial substantially undrawn product that is constituted by two sets of filaments in which the filaments of the respective sets are mutually parallel and are arranged transversely with respect to the filaments of the other set; and cutting said component, after extrusion, in a helical direction so as to obtain a layer element;

wherein the filaments of the respective sets of said initial substantially undrawn product, in the regions where they mutually join, interpenetrate by less than 50% of the thickness formed by one of the sets of filaments;

and wherein the total thickness of the initial substantially undrawn component is in excess of 8 mm;

and wherein the method further comprises the step of providing cavities at the regions where the filaments of the respective sets join such that said cavities contain a gas and are surrounded by the plastic material that forms said filaments.

5. Method according to claim 4, further comprising the step of drawing the filaments of a first set of filaments by drawing the material that passes through the joint regions and belongs to the material that is added to the joint by the filaments of said first set.

6. Method according to claim 5, further comprising the step of drawing the other set of filaments, the drawing of the filaments of one set substantially not affecting, in the joint regions, the drawing of the filaments of the other set.

7. Method according to claim 4 further comprising the step of drawing the filaments of a first set of filaments by drawing the material that passes through the joint regions and belongs to the material that is added to the joint by the filaments of said first set such that the gas bubble contained in said cavity after drawing is adapted to act as a separator between the material that joins the mutually transverse filaments and such that the joining region between said filaments is internally provided with a separator element that is surrounded by plastic material.

8. Method according to claim 7 further comprising the step of drawing the other set of filaments, the drawing of the filaments of one set substantially not affecting, in the joining regions, the drawing of the filaments of the other set.

* * * * *